United States Patent [19]

Dietrich et al.

[11] Patent Number: 6,032,121

[45] Date of Patent: Feb. 29, 2000

[54] METHOD FOR PROACTIVE PLANNING

[75] Inventors: Brenda Lynn Dietrich, Yorktown Heights; Thomas O'Leary, Fishkill; Russell Alan Rushmeier, Mount Kisco, all of N.Y.; David Lawton Shannon, New Fairfield, Conn.; Robert Wang, White Plains, N.Y.

[73] Assignee: International Business Machines Corporation, Armonk, N.Y.

[21] Appl. No.: 08/856,854

[22] Filed: May 15, 1997

[51] Int. Cl.[7] .............................. G06F 17/60; G06F 7/08; G06F 15/17; G06G 7/78

[52] U.S. Cl. .................... 705/8; 705/10; 705/28; 701/202; 701/23

[58] Field of Search .................. 705/8, 3, 28, 26; 701/202, 23; 364/468.06, 468.01; 707/3; 345/163; 370/248

[56] References Cited

U.S. PATENT DOCUMENTS

| | | | |
|---|---|---|---|
| 5,089,978 | 2/1992 | Lipner et al. | 364/551.01 |
| 5,303,147 | 4/1994 | Oba et al. | 364/402 |
| 5,331,545 | 7/1994 | Yajima et al. | 364/401 |
| 5,596,502 | 1/1997 | Koski et al. | 364/468.01 |
| 5,666,493 | 9/1997 | Wojcik et al. | 705/26 |
| 5,692,129 | 11/1997 | Sonderegger et al. | 395/200.11 |
| 5,715,450 | 2/1998 | Ambrose et al. | 395/614 |
| 5,758,329 | 5/1998 | Wojcik et al. | 705/28 |
| 5,819,263 | 10/1998 | Bromley et al. | 703/3 |
| 5,826,236 | 10/1998 | Narimatsu et al. | 705/8 |
| 5,845,258 | 12/1998 | Kennedy | 705/8 |
| 5,850,617 | 12/1998 | Libby | 701/202 |

*Primary Examiner*—Allen R. MacDonald
*Assistant Examiner*—Pedro R. Kanof
*Attorney, Agent, or Firm*—McGinn & Gibb, P.C.; Stephen C. Kaufman, Esq.

[57] ABSTRACT

A proactive planning methodology and system. The invention reconceptualizes current (delimited) calendar-based planning approaches, where planning is done at fixed or arbitrary times, in favor of a proactive planning methodology which can use information about real time changes in input data used for planning, for determining when a revised plan should be generated. The proactive planning methodology may determine, inter alia, that immediate planning is necessary, or it may schedule the generation of a new plan at some time in the future.

18 Claims, 13 Drawing Sheets

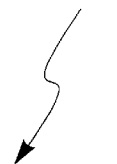

```
For each change in data
    initialize Activity_set = EMPTY

Determine the set of activities and corresponding dates affected by the data
    change
Add these activities and their dates to the activity set For each activity in Activity_set
    determine the date (d1) of the activity
    off setting by the time (t) required for the planning process, create a
    proposed planning event with date d2=d-t.
    add this proposed planning event to the proposed planning event list.
```

Fig.9

```
For each change in data
    initialize Activity_set = EMPTY

Determine the set of activities and corresponding dates affected by the data
      change
    Add these activities and their dates to the activity set For each activity in Activity_set
        determine the date (d1) of the activity
        off setting by the time (t) required for the planning process, create a
        proposed planning event with date d2=d-t.
        add this proposed planning event to the proposed planning event list.
        determine the set of prerequisite activities for the selected activity
        add these prerequisite activities to the Activity_set
```

Fig.10

Assume that the plan dates (or time periods) are indexed 1,2,..., T
with 1 being the earliest,
and that the plan activities are indexed 1,2,..., J
Let current_plan(i,j) denote the quantity of activity j in period i the current
plan and new_plan (i,j) denote the quantity of activity j in period i in the
new plan. Assume that difference thresholds tol(j,i) have been specified.

---

Time_period = earliest plan period
Activity = first plan activity
difference = FALSE Do while difference = FALSE & i< T+1
    if | current_plan (i,j) - new_plan (i,j) | > tol(i,j) then DIFFERENCE = TRUE
    if j<J then j=j+1
    else i=i+1
    end if difference = TRUE then add a proposed planning event with date i-t.

Fig.12

METHOD FOR PROACTIVE PLANNING

FIELD OF THE INVENTION

This invention relates to a method suitable for proactive planning.

INTRODUCTION TO THE INVENTION

Organizations typically plan future activities based on forecasts, assumptions, or predictions about the future environment. The forecasts may be based on historical data; assumptions are typically based on present conditions; and, predictions may be provided by various expert sources. For example, a manufacturing company may determine a production plan based on a forecast of future demands and assumptions about the availability of raw materials, labor, and manufacturing capacity. An airline may decide to add additional routes based on assumptions about airport capacity and predictions of new passenger travel patterns.

In most organizations, this planning process follows an established calendar, with the frequency of the process determined by the time scale of the business activities. For example, shipment planning may be done daily or weekly; production planning may be done monthly or quarterly; and, capital investment plans may be made annually. This planning is typically done on fixed, pre-specified dates. Shipment planning may by done each Friday for the following week, production planning may be done during the last week of each month for the following month, and capital investment planning may be done each October for the following year. A depiction of a typical calendar based planning process is given in FIG. 1, numeral 10.

As suggested in FIG. 1, the passage of time causes changes in the organization's data. When the time for a scheduled planning event is reached, data from the organization's databases is used as input to a planning process, which produces a plan. We note that although the organization's databases are updated to reflect the passage of time, the planning calendar is not updated by changes in this data or by other external events. The planning process is executed only when the data and time specified in the planning calendar are reached.

A more detailed depiction of a planning process that uses a planning engine is given in FIG. 2, numeral 12.

As in FIG. 1, the organization's data bases are updated to provide a timely reflection of the environment. At the beginning of the planning event, planning data is extracted from the databases for use as input to the planning process. This data may be reviewed and revised by experts. The revised planning data is used as input to one or more planning engines. The planning engine produces a plan, which may be reviewed and possibly revised by experts. Although not shown in this figure, reruns of the planning engine may also occur. Once the plan is agreed to, it is typically placed in the organization's databases or otherwise communicated. The plan may be used as one of the inputs to the organization's execution processes.

Many sophisticated analytical methods have been developed for planning future activities. Examples of such methods are given in *Logistics of Production and Inventory* edited by S. C. Graves, A. H. G. Rinnooy Kan, and P. H. Zipkin, 1993, North Holland. In many instances, these analytical methods have been implemented as computer programs and are sold as software tools which aid the decision maker. Typically a tool receives data, either through a user interface, a specified file format, or a program which retrieves data from an organization's databases, uses this data as parameters to a mathematical model (either analytic or simulation), solves the model, and then presents the solution, either through the user interface, in files or reports, or by putting the solution elements in pre-specified locations in the organization's database. The apparatus that performs these steps (receiving data, using the data as parameters in a model, solving the model, and returning a solution) is referred to, in this invention, as a planning engine. The plan produced by a planning engine may be reviewed and modified by human planners, and eventually makes its way into the computer systems that control and monitor the activities of the organization (here referred to as the organization's execution system). We refer to the use of such engines, together with any human analysis of the engine's output and the communication of the resulting plan through the organization as a planning event.

A planning event may be a simple process, involving only the running of a planning engine and the posting of the output of that planning engine in a database; or it may be a more elaborate process involving repeated use of multiple planning engines, review meetings, and widespread, structured communication of the reviewed plan. We note that simple planning processes are typically used for producing plans with short time horizons or involving few organizational resources (e.g., planning a week of shipments), while more complex processes are typically used for producing plans with long horizons, or for producing plans that involve significant resources (e.g., an airline's flight schedule).

The quality of the plan, which is reflected in the overall performance measurements of the organization (e.g., service level, profit, stock price), is determined by both the quality of the planning tools used and the accuracy of the data used by these tools to make the planning decisions. The accuracy of this data (e.g., forecasts, assumptions, and predictions) is not known at the time the plan is made, but becomes known as the organization attempts to execute the planned activities.

SUMMARY OF THE INVENTION

Because of the fixed planning calendar used by most organizations, the quality of a plan is typically not evaluated during the execution period as additional information (e.g., changed assumptions, revised forecasts) becomes available. In addition, the management and responsibility structure of many organizations, in which planning is the responsibility of one group and execution is the responsibility of another group, leaves the organization disinclined to monitor plan quality. Of course, once a plan has become obviously infeasible (that is, impossible to execute) it will have to be revised, either through some formal (emergency) process involving the original planners, or through informal, ad hoc methods involving only the execution team.

The conditions described above indicate a need for novel methods to monitor the quality of a plan, recommend appropriate changes to that plan, and possibly execute these changes. We refer to such methods as "proactive planning" methods because they can provide advanced warnings to planners and to the corresponding execution teams, rather than just reactive responses.

In sum, a proactive planning methodology can monitor information and determine when current plans should be revised. In sharp contrast to extant calendar-based planning approaches, where planning is done at established and arbitrary times, a proactive planning methodology can use information about changes in the input data used for planning to determine when a next plan should be produced. It may determine that immediate re-planning is necessary, or it may schedule the generation of a new plan at some time in the future. Analysis methods and software tools, potentially including those tools used to generate the plan, can be used to evaluate changes in information, to assess the quality of the plan in light of this revised information, and to determine the time of the next plan.

Accordingly, we now disclose a novel method suitable for proactive planning, comprising:

1) employing a planning engine comprising processes for generating an executable plan for a known period of execution;
2) inputting to the planning engine real time planning data; and
3) monitoring and utilizing said input planning data for determining if and/or when the executable plan is to be revised during said period of execution by the planning engine.

The novel method as defined can realize significant advantages, including freeing sophisticated analytical methods and software tools from the artificial restriction of a fixed or arbitrary planning calendar. Thus, the novel method, in sharp contrast to the prior art techniques, can proactively provide a control flow and data integration which can fully exploit the capabilities of planning engines and incremental update features, thereby enabling one to maintain up-to-date plans as changes occur in the business environment.

BRIEF DESCRIPTION OF THE DRAWING

The invention is illustrated in the accompanying drawing, in which:

FIG. 9 examines activities for determining a proposed new planning event;

FIG. 10 demonstrates a process of examining a collection of one or more time variant data changes for determining the planning periods potentially affected by this set of data changes;

FIG. 12 demonstrates a method of comparing two plans; and

DETAILED DESCRIPTION OF THE INVENTION

We assume the existence of one or more databases that include the data that an organization uses for planning purposes. These databases may include assumptions about the business environment, information about the present state and operation of the business, and forecasts of the future business environments. The databases may also include information about the present operation of the organization. We note that the data in the databases may be used for multiple purposes, and that the planning engines may be used to address multiple planning problems. Moreover, this invention is not limited by the specific content, structure, and location of the databases.

We also assume the existence of one or more planning engines that the organization uses to analyze planning data for the purpose of generating plans. This invention is not limited by the specific details of a planning process, or by the selection or function of planning engines used in that process.

We assume a means for collecting data from the databases for use as input to the planning process. We also assume the existence of methods for detecting or communicating changes in a database.

Furthermore, we assume some means for communicating the output of a planning engine (the plan) to at least one of the organization's databases.

Figure 1:
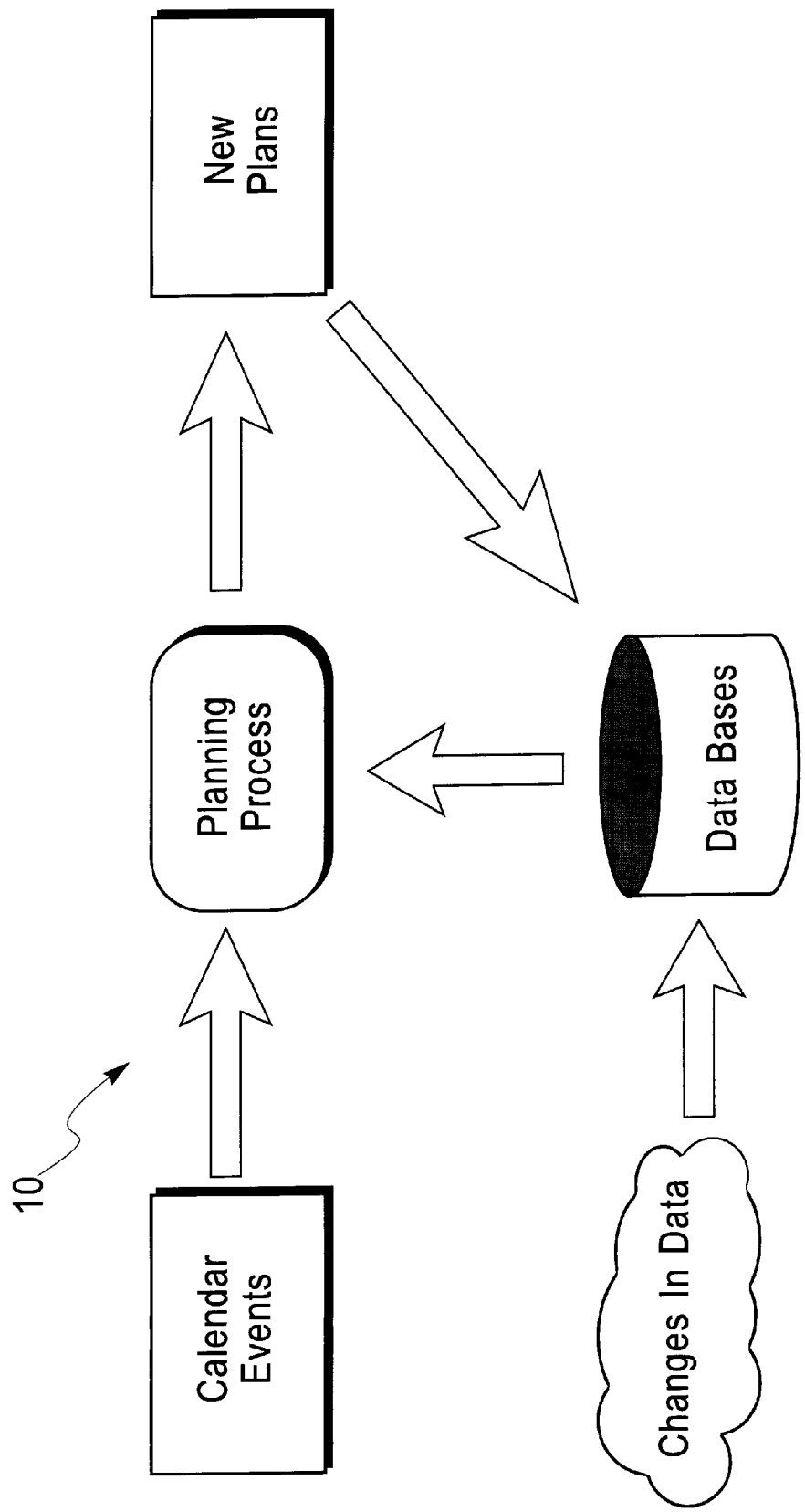
FIG. 1 shows a representative calendar based planning process.
Figure 2:
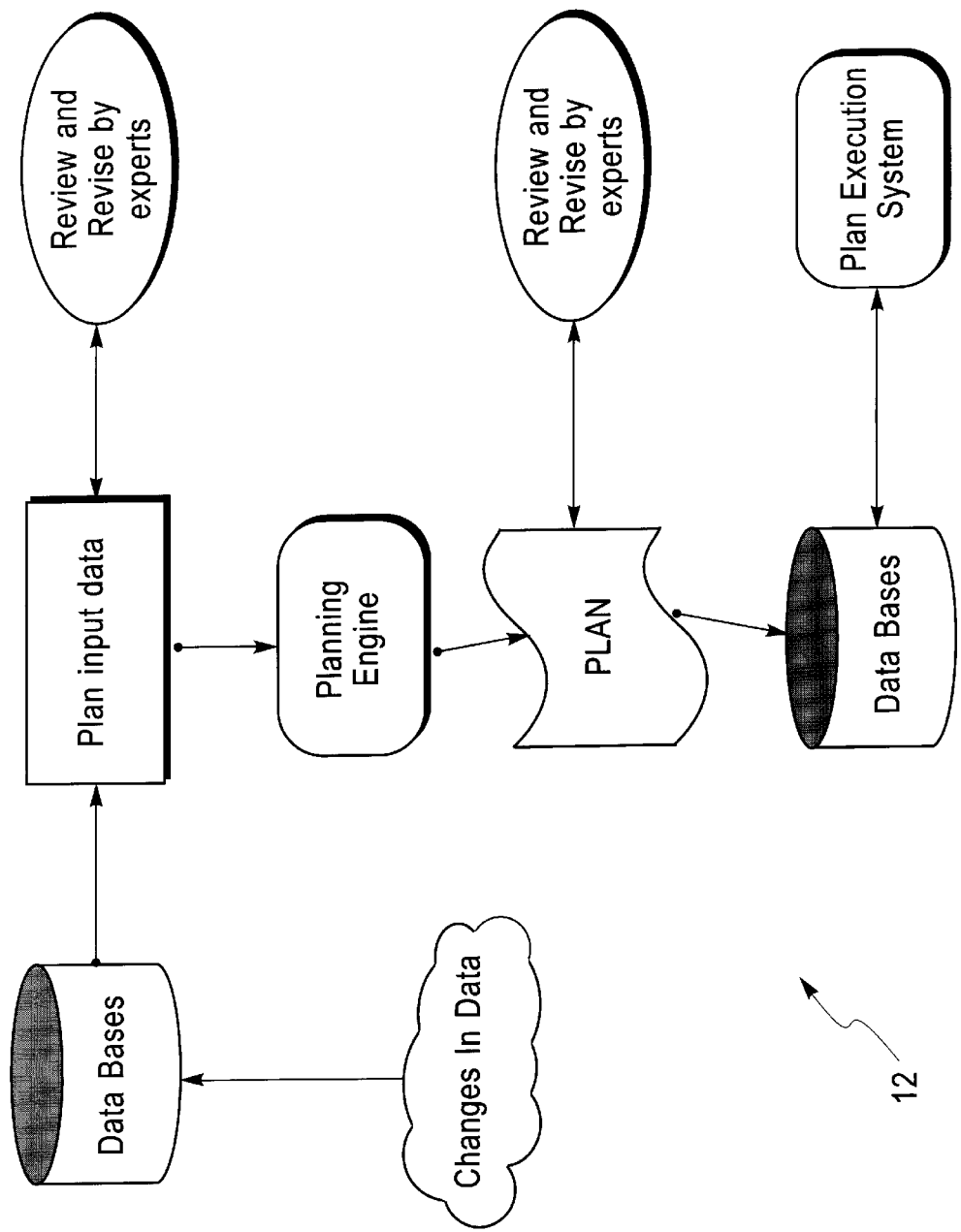
FIG. 2 provides a more detailed depiction of a calendar based planning process.
Figure 3:
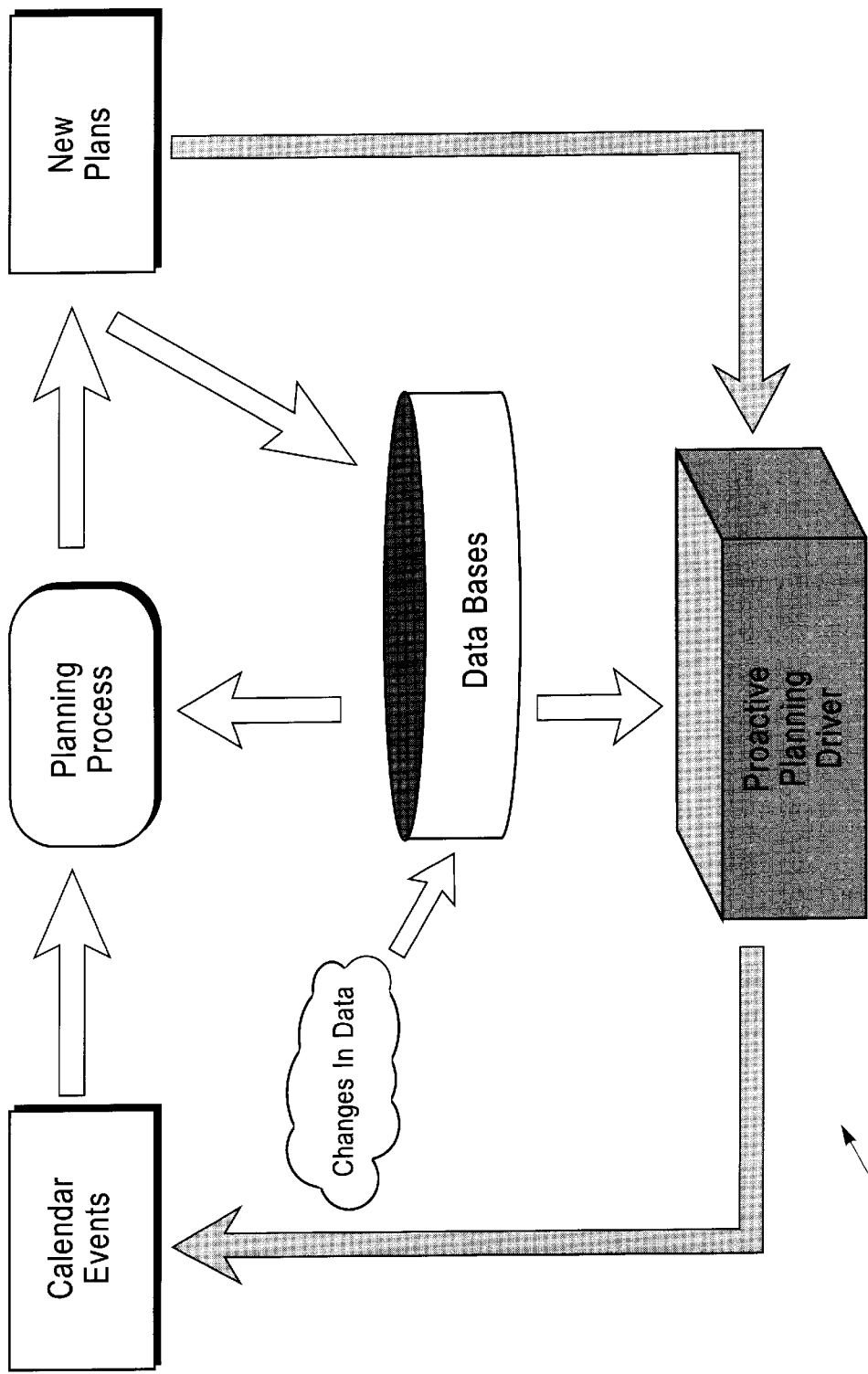
FIG. 3 shows a proactive planning system.

A novel element of this invention is the proactive use of planning data for determining when the next planning event should take place. This is in sharp contrast to current practices, which use an established planning calendar. This proactive aspect of planning is preferably enabled by the use of a proactive planning driver which uses information about changes in the database to determine when a new plan should be generated. This step, of analyzing changes in data and recommending a time at which a new plan should be generated is called scheduling a planning event. Together, as shown in FIG. 3 numeral 14, the driver mechanism, the databases, and the planning engines define a proactive planning system.

There are many ways to implement proactive planning. However, any proactive planning methodology/system must have the following essential components:
1. at least one database;
2. at least one planning engine;
3. a proactive planning driver which comprises the following essential functions:
   (a) a means for detecting changes in at least one database;
   (b) a means for using information about the changes in the database to determine the time at which a planning event should next occur;
   (c) a means for communicating this time to the people or processes responsible for producing the organization's plans.

This invention does not require that the proactive planning driver be implemented as a single computer program, or even that it run on a single computer. In fact, it is expected that in most implementations of proactive planning systems, the database(s) and planning engine(s) are distributed across multiple computers, with the databases typically residing on mainframe computers and the planning engines residing on one or more workstations designed for numerically intensive computing. The functions of the proactive planning driver may be distributed in any manner. For example, the functions that detect changes in a database may most naturally reside on the computer that holds the database, while a function that analyzes the changes in data to determine the time for the next plan may reside on the computer on which the planning engine would run.

Figure 4:
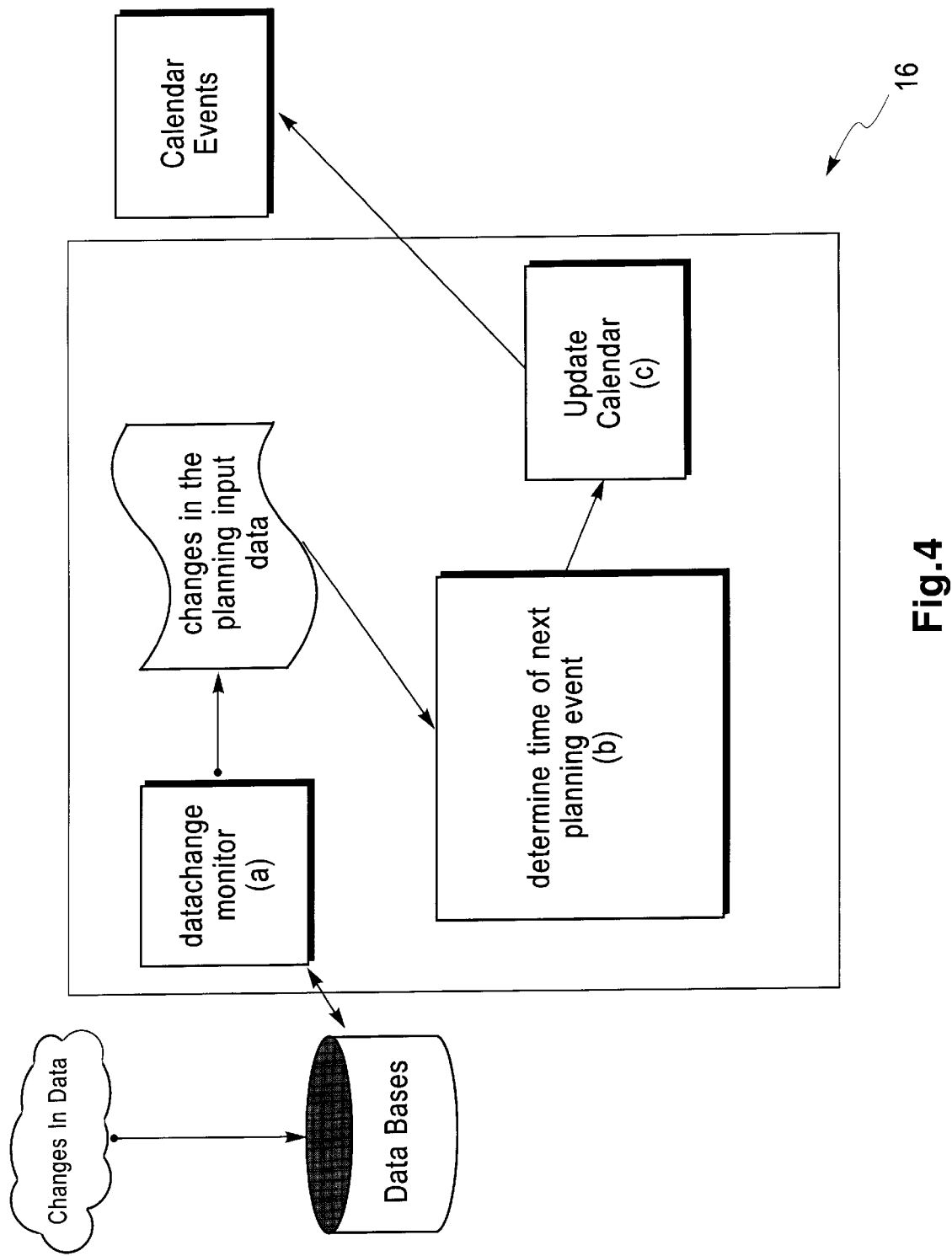
FIG. 4 shows a proactive planning driver comprising essential functions.

FIG. 4, numeral 16, depicts the essential functions of a proactive planning driver, and depicts how these functions work together to produce new or updated calendar events. Each of the essential functions 3(a)–(c) can be implemented in several different ways, and this invention is not limited to any specific implementation. For example, function 3(a) could be implemented by capturing periodic images of the database, comparing the most recent image to the previous image, and recording differences. As an alternative implementation, the computer processes which are allowed to modify the database (e.g., transactions) could be augmented to also send messages which describe the modification (e.g., which element is being modified, and the new value) to the proactive planning driver. In a preferred implementation, function 3(a) is implemented through use of a database change monitor which is triggered by record-level changes in the database (e.g., insert, update, or delete orders).

Function 3(b) could be implemented as a set of logical decisions regarding the nature of the changes in the data, or could involve complex analysis of the quality of the existing plan with respect to the changes in the data, and could potentially include use of the planning engines that were used to produce the plan. In its simplest embodiment, the proactive planning driver could simply recommend immediate re-planning in response to any detected change in the data. In fact, this approach may be appropriate in some environments, particularly those environments in which the planning horizon is very short (e.g., hours or days). Function (b) could also be implemented as a collection of "if . . . then " rules on the changes in the data (e.g., if demand forecast for any month increases by more than 5% over the previous demand forecast for that month, schedule a new planning event for the beginning of that month), or through the use of sophisticated data analysis tools that track trends in the changes in the data to determine when replanning is required.

For those environments in which the effort required requiring extensive come a plan is considerable, requiring extensive computation (by computers), human analysis, or organizational communication, re-planning is not an activity that should be undertaken with unnecessary frequency. In these complex planning environments, analyzing changes in the data provides some guidance on determining the appropriate time for re-planning, but there is the potential for further improvements in the timing of planning events through analyzing the quality of the current plan with respect to the data changes. Planning engines, including the engine that was used to generate the current plan, can be used in this analysis.

Function 3(c) can be implemented by generating a message that is sent to a human planner. Alternatively, a function can be implemented to generate updates to a database that contains the schedule of planning events.

To work effectively with planning engines when determining the time of the next planning event, a proactive planning system may include one or more additional components, such as:

4. planning engine controller that provides data to a planning engine, causes a planning engine to run, and monitors the status of the planning engine (e.g., idle, busy, ready to return a solution);
5. a plan comparison function that compares one plan to another to determine the extent or timing of differences between the two plans.

A simple implementation of function 4 would be as a subroutine call, with the name of the changed database(s) passed as a parameter, and the return code indicating whether the planning engine had completed a plan. The plan comparison function (5) may be a component of a planning engine itself, or may be implemented using a simple analytic tool such as a spreadsheet.

As an important special case of proactive planning, we further elaborate on the use of proactive planning for short-term operational planning. In this case, the planning horizon of the planning process is short, typically hours or days, and the plan is preferably communicated to the execution system soon after it is created, often with minimal human review. The operational planning process is executed frequently, typically once per day. Sophisticated planning engines may be used in this planning, with the input data obtained, at least in part, from the execution system. The execution system contains information about which events have happened and about which events have been planned for the near future. As time passes, events may or may not happen as planned, and information regarding the actual execution of planned events is typically captured in the organization's execution system databases. In a proactive planning system, the data in the execution system is monitored to determine when a new plan is needed. When changes in the execution data are detected, the system analyzes the data changes, and schedules a new (usually immediate) planning event if one is required.

As a specific example, we discuss the case of shipment planning. Input data to a shipment planning engine includes information about the items to be shipped, such as size, weight, origin (ship from), and destination (ship to), customer delivery date, and available shipment date. It also includes information about the availability and cost of various transportation resources, such as the location, availability, and cost of private fleet vehicles, and the contracted rates of one or more carriers. For a manufacturer which is planning shipments of finished product, the available shipment date is typically obtained from a manufacturing execution system or inventory management system. This data reflects whether items are in finished goods inventory (available now) or are still in production (available at some planned time in the future). The output of a shipment planning engine (a shipment plan) would, for instance, specify which items should be carried on each of the private fleet vehicles, and which should be tendered to contracted carriers. For each vehicle, the plan might include a route and even a specific loading order for the items.

The execution system is used to record any changes in customer requirements (e.g., destination, quantity, delivery date) as well as changes in product status (e.g., changes in projected completion date) and in transportation resources (e.g., availability of private fleet). Some of these changes clearly necessitate immediate re-planning, while others can simply be noted and reflected in some later plan. For example, changes such as a six hour manufacturing delay for an item that is planned to be shipped on a truck that is scheduled to depart in one hour, or a change in destination for an item that is planned to be shipped by common carrier, are likely to require re-planning. In the first case, the current plan has become infeasible (because the shipment items will not be ready on time) while in the second case, it may be possible to significantly improve the quality of the plan by revising the plan to include the item in one of the planned private fleet routes.

In contrast, a new customer order with a delivery date far in the future can probably be addressed by some future, already scheduled, planning event. Again, departures in one hour, or a change in destination for an item that is planned to be shipped by common carrier, are likely to require re-planning.

A Preferred Implementation of a Proactive Planning System

There are many different ways to implement a proactive planning system. FIG. 3 depicted a high-level diagram of a proactive planning system. As in a calendar-based planning system, changes in data are reflected in the organization's databases. The proactive planning driver is made aware of these changes in data, analyses them, and makes changes to the planning calendar. Changes to the planning calendar include scheduling a new planning event, changing the time of a planning event, or eliminating a previously scheduled planning event. The actual sequence of steps and flow of data within the planning process (or planning event) remains unchanged, only the timing of the planning events is affected.

We discuss two specific methods of proactive planning. The first method monitors changes in data as they are communicated to the database and determines whether each change in data necessitates a new planning event. In our implementation, if re-planning is required, the planning process is begun immediately; however it should be obvious to one skilled in the art that a future planning event could easily be scheduled instead. This method is well suited for operational planning, in which the planning horizon is short, the planning process is fairly simple, and the result of the planning process (the new plan) needs to be quickly communicated to the execution system. However, this invention is not limited to the application of this method in the operation planning domain.

The second method, which is better suited for planning processes with longer planning horizons, involves analyzing changes in the data in more detail, and determining the effect of the data change on the current plan. A data change may have no effect on a plan; it may render some future portion of the plan impossible; or it may create an opportunity for improving the plan by revising some portion of it. By determining which future portion of the plan is likely to be affected by a change in data leads, our method determines when the next planning event should occur. As a special case of this second method, we describe in detail the use of planning engines, or more specifically the analysis of the plans produced by planning engines, to schedule planning events. This method is well suited for tactical or strategic planning, in which the planning process may be long and complex, and in which the planning process is typically loosely coupled with the execution process. However, this invention is not limited to the application of these methods is in a tactical or strategic planning domain.

Method 1: Event Driven Proactive Planning

Figure 5:
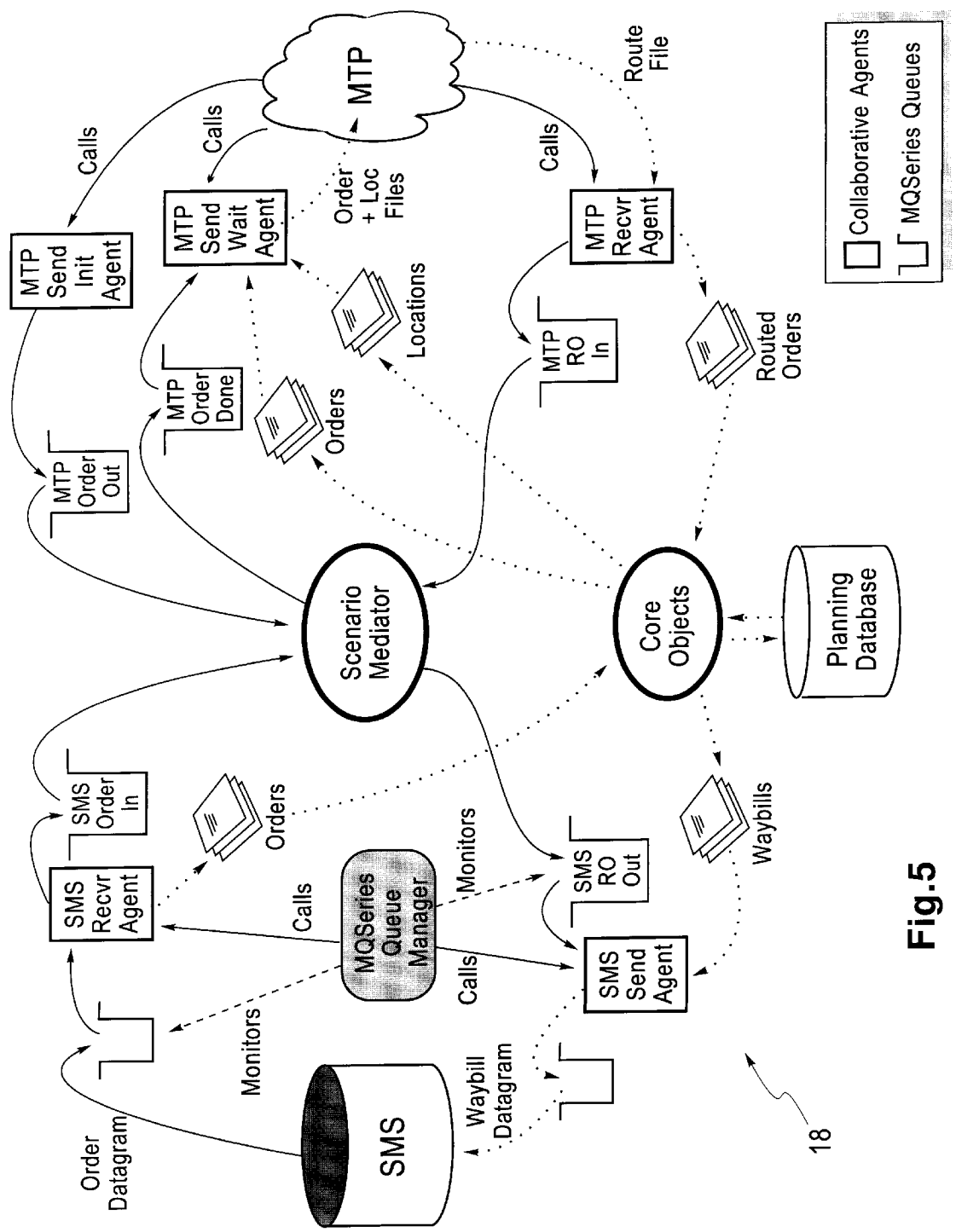
FIG. 5 shows a collaborative agent architecture for a proactive shipment planning methodology/system.

The preferred implementation of event driven proactive planning is illustrated by way of a proactive shipment planning scenario. The preferred implementation architecture comprises a set of collaborative agents (computer programs) which can monitor asynchronous messages and perform asynchronous transactions. FIG. 5, numeral 18, illustrates a collaborative agent architecture for a proactive shipment planning system. This system can integrate a shipping execution system (known as SMS), and a shipment planning engine (known as MTP). In FIG. 5, agents are depicted as rectangles.

As shown in FIG. 5, the proactive planning driver includes three components: 1) a Planning Database for storing data and plans obtained from external systems (i.e., execution systems and planning engines); 2) Awareness Agents, which monitor execution systems and planning engines to trigger planning or data communication; and 3) a Scenario Mediator which receives, sorts, and broadcasts asynchronous messages. The Agents post triggers as asynchronous messages and perform data translations between external data and the Planning Databases. In the proactive shipment planning scenario, each message type is assigned a priority number. The Scenario Mediator broadcasts either a Null message or a received message to all agents during each iteration. If more than one message has been received, the Scenario Mediator broadcasts the message which has the highest priority. Each Agent is given equal opportunity to respond with a new message. The Scenario Mediator then sorts the new messages with the remaining messages.

This procedure is repeated until a "shutdown message" is received (which is the signal, usually from a human operator, that the proactive planning system is to cease processing).

Figure 6:
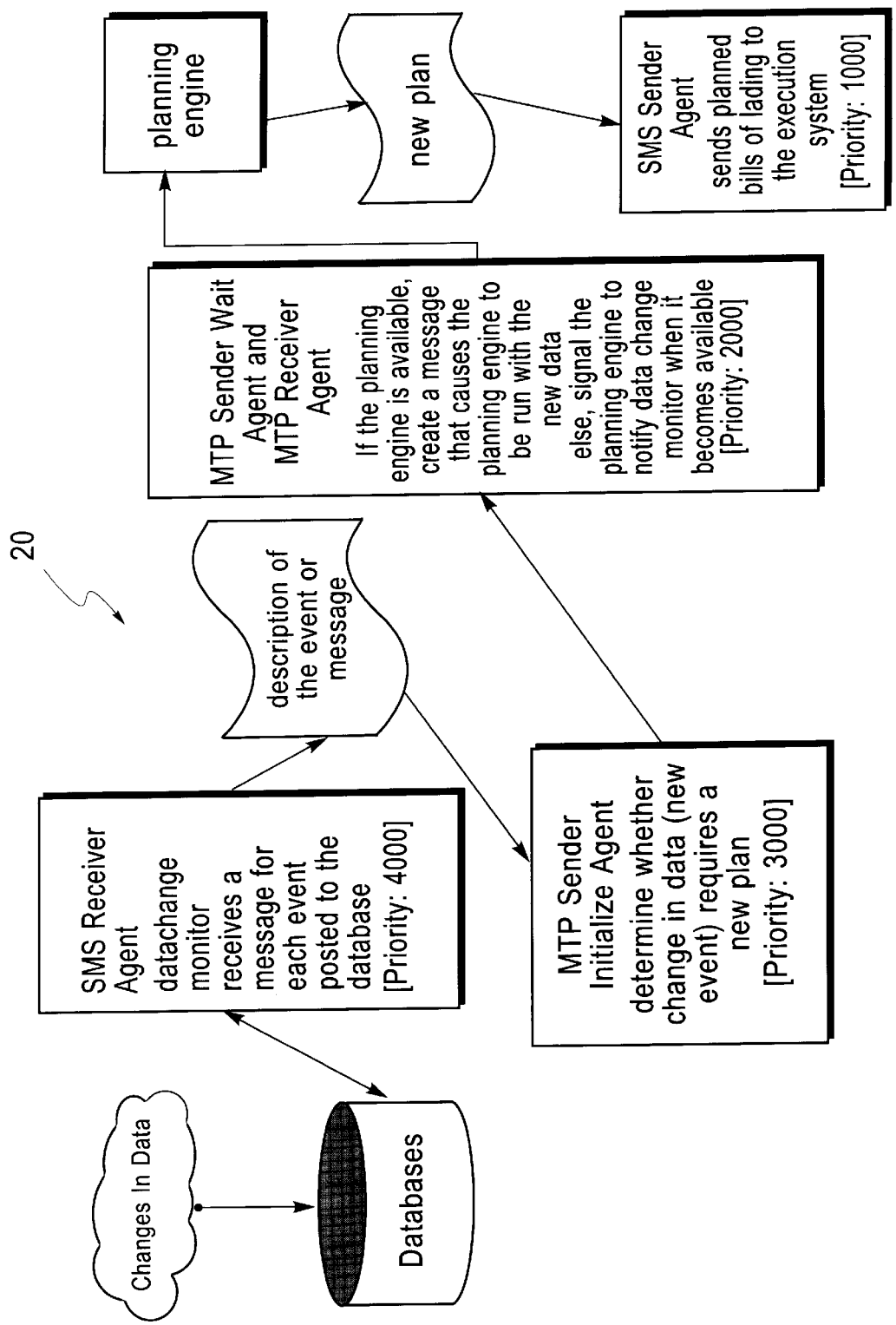
FIG. 6 shows how agents may be used to implement a proactive shipment planning scenario.

FIG. 6, numeral 10, shows how these agents can be used to implement a proactive shipment planning scenario. By using messages of a particular priority number through the Scenario Mediator, the Awareness Agents collaborate through the Scenario Mediator to determine the timing of shipment planning events and the contents of the planning engine input data. (In a more complex scenario in which each agent would be able to post more than one type of message, each message type would be assigned a unique priority number.) In general, agent priorities should be assigned based on the impact each agent has on the plan quality. In this simple example, since plan quality depends solely on input changes (i.e., ship order creation, update, or deletion), SMS Receiver Agent, which monitors SMS ship order entry activities, posts messages with the highest priority. This choice of priorities, in effect, allows ship order entry events to proceed before planning events. On the other hand, the SMS Sender Agent, which sends planned bills of lading back to the shipping execution system, posts messages with the lowest priority.

Method 2: Analysis Driven Proactive Planning

Figure 7:
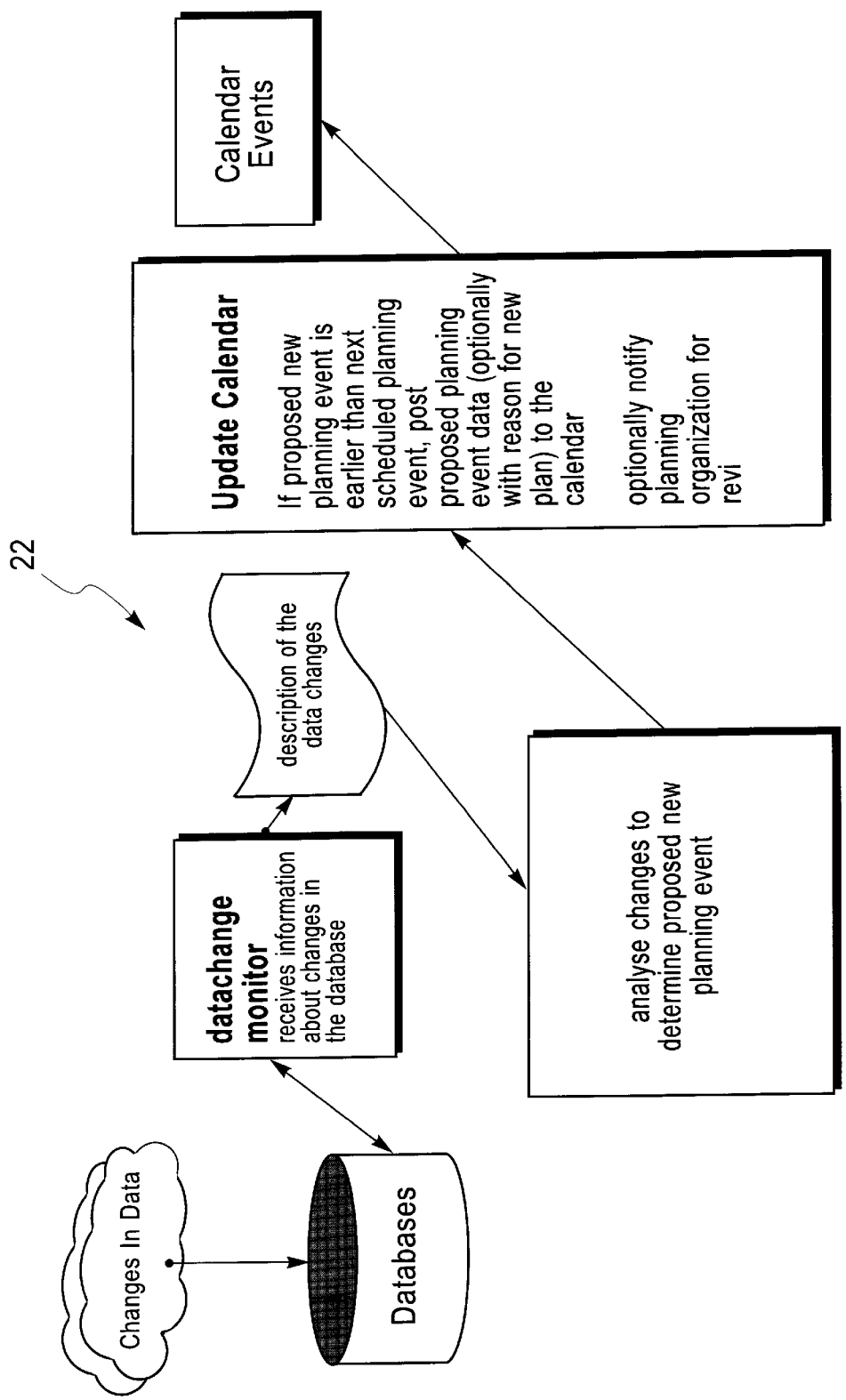
FIG. 7 shows analysis based proactive planning.

Whereas the first method involved analyzing individual changes in the data, typically corresponding to an event, this method (see illustrative FIG. 7, numeral 22) is capable of analyzing more complex change data. As an additional point of contrast, while the first method would typically be used to determine if a new plan should be generated immediately, this second method is used to determine the most appropriate time to begin the next planning process, that is, to schedule the next planning event.

A plan can be regarded as a collection of proposed future activities. For each activity, there is an associated starting time, typically expressed as a date or calendar interval (e.g., fourth quarter 1999). Each activity requires some set of resources, and an activity may have prerequisite activities. Some activities, such as manufacturing production, are described in part by a "quantity" or level that indicates the extent to which that activity takes place.

The data that is used to generate a plan can be classified into two main types: time invariant and time variant. Time variant data has dates associated with it, while time invariant data does not. Some real world information is truly time invariant, for example, the speed of light, the earth's gravitational constant, and the boiling point of water at sea level. For the purposes of planning, time invariant data is data that is constant for the planning horizon. Examples typically include economic and demographic assumptions (inflation, population size, annual growth rate of an industry). Data representing strategic business decisions that have already been made is often treated as time invariant in shorter term planning models. For example, the set of cities served by an airline does, in reality vary over time, but would typically be treated as time invariant when planning a flight schedule.

Time variant data has dates associated with it, describing the portion of the planning horizon for which that data is effective.

The observation that time variant data has associated dates leads us to a basic method for determining the portion of a plan that is likely to be affected by a change in time variant data. Specifically, the portions of the plan that correspond to time periods that are coincident with or later than the time periods associated with the data change may be affected. For example, in production planning, a forecast of demand for each of the end products in each future period is important input data. If the forecast of demand for a particular product, say product A, in a particular period, say December 1999, is increased, the planned production quantity of A in December 1999 should, if possible, be increased, and a new production plan should be produced and in place by this time. If the manufacturing company requires 20 days to produce and communicate a production plan, a new production plan should be scheduled for no later than Nov. 10, 1999. This date is added to a list of proposed planning event dates. In the method described here, each of the time variant demand changes is analyzed in a similar manner, the earliest proposed planning date is computed from this list. If this earliest date, the proposed next plan date, is different than the date of the next scheduled planning event, then the proposed next plan date is communicated to the organization, through posting in a database, a message to the planning organization, or some other means. In the preferred implementation, the proposed next plan date together with the data change associated with that date, are added to the planning events calendar for review by the planning organization.

Figure 8:
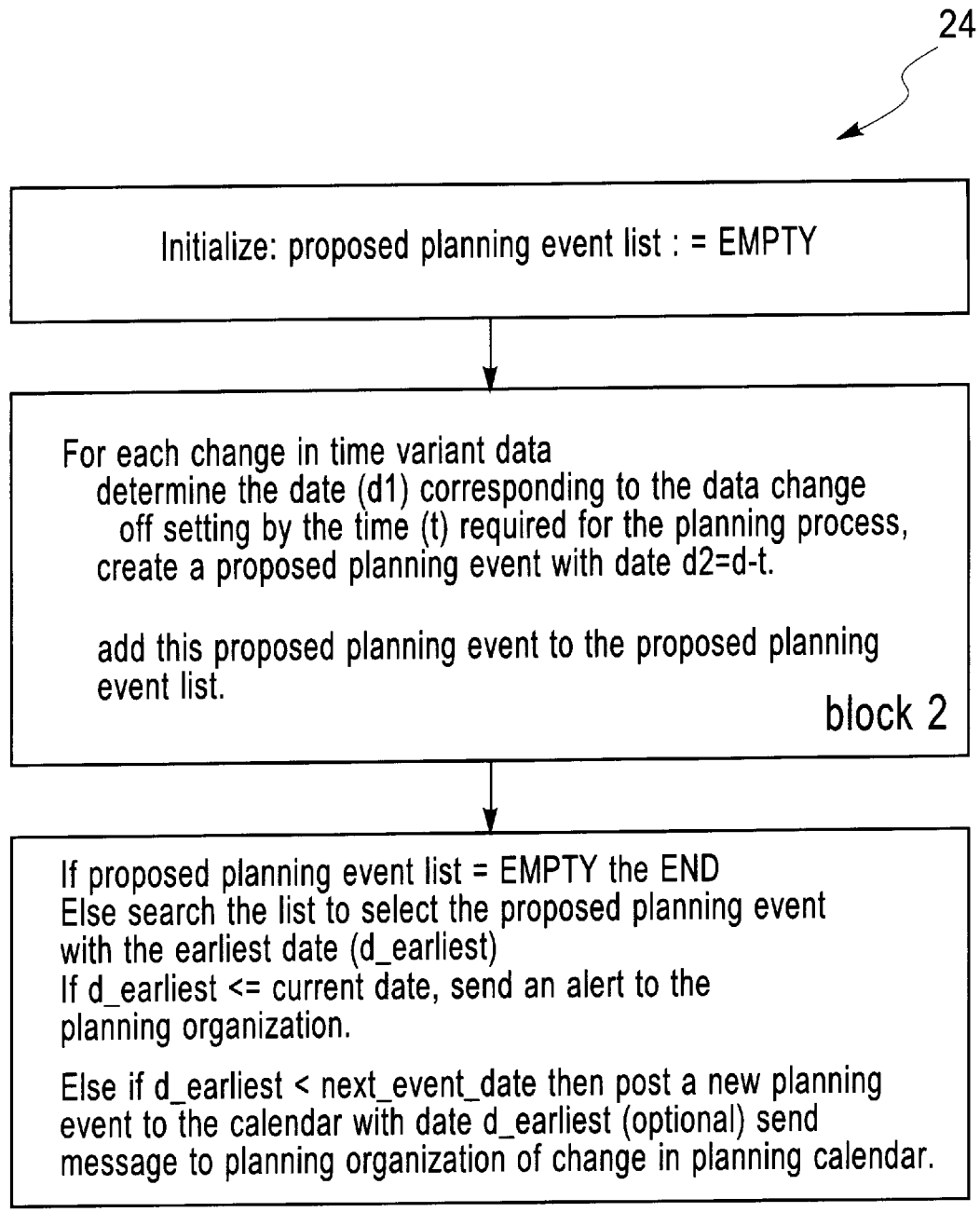
FIG. 8 shows procedures for determining a proposed new planning event.

FIG. 8, numeral 24, demonstrates the process of examining a collection of one or more time variant data changes to determine the planning periods potentially affected by this set of data changes. While the set of data changes is not empty, a data change is selected. The earliest date associated with this data change is determined. FIG. 8 also shows the selection of the "first" or earliest affected date, the computation of the target date for the next planning event, and the communication of this date through databases or notification of human planners.

There are a numerous ways in which this earliest date could be determined. For illustrative purposes, we demonstrate in FIG. 9, numeral 26, a method which examines the activities in the plan to determine which of these activities could be affected by the change in data. In general, determining whether a planned activity could be affected by a change in data will require the implementation of a separate method that adequately represents the relationship between the activities and the data. For example, in the manufacturing environment, determining that a change in demand forecast for a product could affect the planned production quantity for that product requires knowing that the planning process attempts to plan to produce enough product to meet demand. Determining that a change in the projected availability of a raw material could affect the planned-- production level for a product that uses knowledge of the set of materials used to produce each product, as well as knowledge that the production plan should limit production to levels that do not exceed projected raw material availability.

In general, those skilled in the art of building planning engines can also implement functions that can analyse individual changes in the planning engine's input data and determine which of the engine's outputs (the activities in the plan) are likely to be affected by the change, and we assume the existence of such methods to analyze individual changes in plan data and determine activities that might be affected by the change. We note that, given knowledge of the activities in the plan, and the resources used to produce these activities, (that is, knowledge of the planning input data) often it is quite easy to determine a set of activities that are directly affected by a change in the input data.

We also note that other methods for determining the portion of a plan affected by a data change, that is methods that do not involve the determining of a selected set of activities, are also possible, and note that one skilled in the art could easily replace the function block 2 in FIG. 8 by method other than the one detailed in FIG. 9.

When activities in a plan have prerequisite activities, a change in one portion of a plan may require corresponding changes to an earlier portion of a plan. This circumstance is well illustrated in manufacturing, if the production of an end product requires earlier production of the subassemblies used in that end product. In the manufacturing example above, suppose that for each unit of product A produced in a given month, four units of subassembly B must be produced in the preceding month. Then an increase in the demand for product A in December 1999, should be addressed in the plan by an increase in production of product A in December and an increase in production of product B in November. Again, assuming that the organization requires 20 days to generate and communicate a production plan, a planning event is proposed for Oct. 10, 1999.

FIG. 10, numeral 28, demonstrates the process of examining a collection of one or more time variant data changes to determine the planning periods potentially affected by this set of data changes. FIG. 10 differs from FIG. 9 in that FIG. 10 shows that the activities affected by the data change, and chain of prerequisite activities are examined in the computation of the proposed new plan date.

As a special case of this analysis-based method, we describe in detail the use of planning engines, or more specifically the analysis of the plans produced by planning engines, to schedule planning events. This method involves using one or more planning engines, possibly including the planning engine that was used in the most recent planning process to generate the current plan. The planning engine is run with the new data, and its output (the proposed new plan) is compared to the current plan. If the two plans are the same, or sufficiently similar, a new planning event is not scheduled. If the two plans differ significantly, the future time at which the new plan becomes different from the old plan (either in solution quality or in feasibility) is determined. Then, using information about the amount of time it takes to fully execute a planning event (e.g., data and plan review steps), a date for the next planning event is determined and a new planning event is scheduled for this date.

Figure 11:
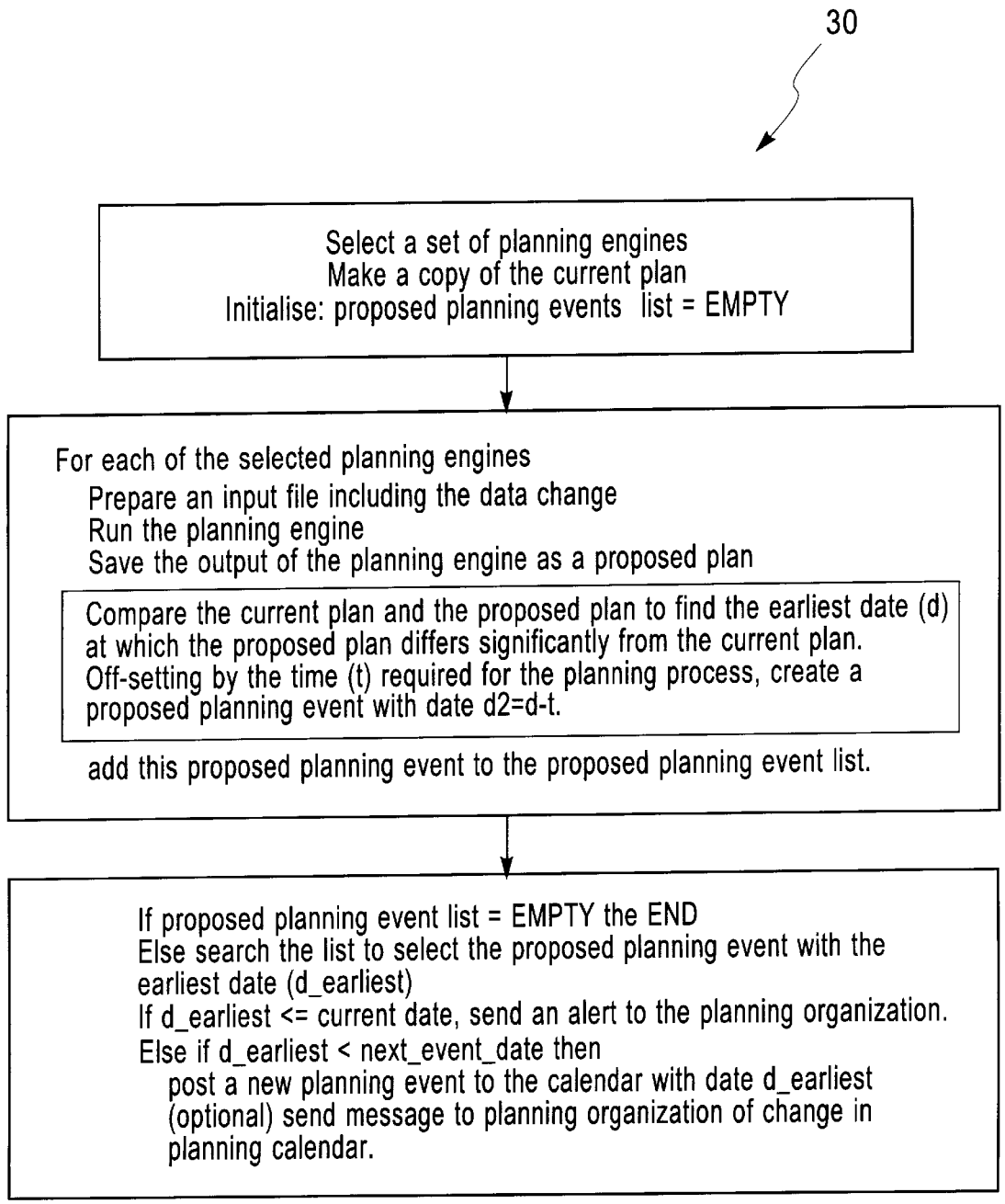
FIG. 11 illustrates using a planning engine to determine a new plan date.

FIG. 11, numeral 30, displays the sequence of steps described above: select one or more planning engines, format the data, including the data changes, for use by each selected planning engine, run each planning engine and produce a new plan, compare each plan to the current plan to determine the earliest time period at which the new plan differs from the original plan, compute a proposed new plan date for this difference date, select the earliest proposed new plan date, compare this date to the next scheduled plan date, and, if the new date is earlier than the next scheduled date, communicate the new date, and the reason (e.g., difference in plans) to the organization.

One skilled in the art will note that there are many known methods of comparing two plans, ranging from simple date-by-date and activity-by-activity comparison procedures to sophisticated analysis methods involving, for example, cumulative activity analysis or comparison of performance metrics, as well as methods that allow for the detection of specific differences between the two plans by setting one or more difference thresholds for the activities.

We illustrate two methods, one based on a date-by-date and activity-by-activity comparison, the other based on defined measures of the plan. For the first method we assume that the plan can be expressed as a matrix of numbers, with each row of the matrix representing a planned activity and each column representing a date or a time interval. We assume that for each activity-date pair, a "difference-level" is specified, either as an absolute value or as a percentage. In the date-by-date, activity-by-activity comparison, a doubly nested loop is used. The outer loop indexes across the dates, starting with the earliest date. The inner loop indexes across activities. For each date-activity pair, the current plan value is compared to the new plan value. If the difference exceeds the specified tolerance, that date is reported as the earliest affected date (d in FIG. 11), and the loops terminate. This method is shown in FIG. 12, numeral 32.

In the measure based method we do not examine the individual plans in full detail, but assume that some set of plan measurements have been defined. As an example, a manufacturing plan may, in its full detail specify the number of units of each product to produce each week. There may be a large number of products, some of them similar. Commonly similar products are grouped together as a product family. Two plans may differ in the exact number of each individual product to be produced each week (that is, at the date-activity level), while still having the same aggregate production quantities for each product family in each month. Differences in the detailed production plan may be unimportant to the manufacturer, especially if the different products in a family require similar sets of resources. Changes in the aggregate production quantifies for a product family in a month may be very significant, to the manufacturing company, requiring immediate communication to the company's execution units (material procurement, human resources, etc.).

Figure 13:
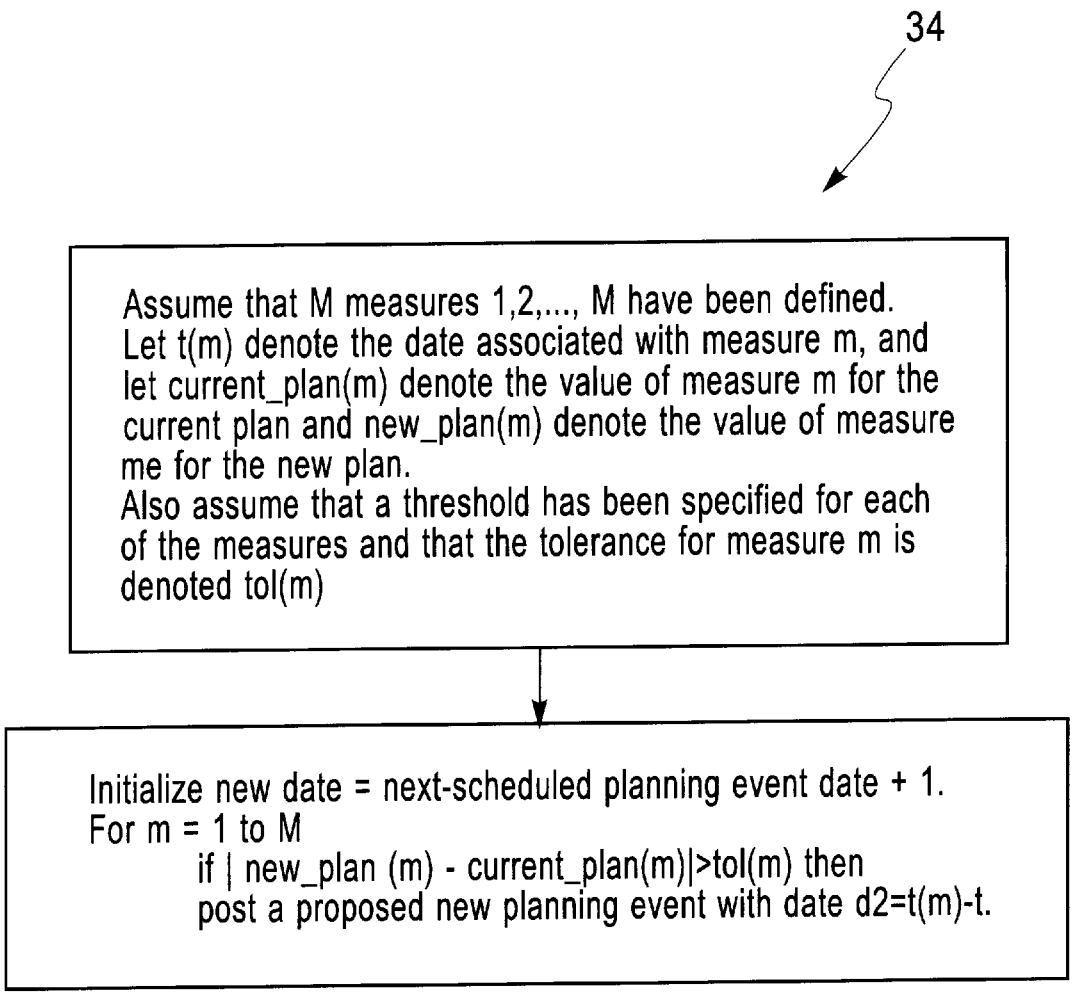
FIG. 13 demonstrates comparing two plans based on defined measures.

We assume that a set of measures have been defined, and that methods for computing these measures for the production plan are available. We also assume that each measure has a date associated with it. For the "monthly product family production" measure, the associated date might by, say, the 15th day of the preceding month. For each measure, the value of that measure for the current plan and the proposed plan are computed. If the difference between these values exceeds some specified threshold, then the date associated with the measure is used as the date of a difference between the plans. The earliest such date is found, it is offset by the required planning time, and a proposed new planning event is added to the proposed planning events list. A diagram of this method is shown in FIG. 13, numeral 34.

We note that developing new methods for the comparison of two plans is an area of active research, and that new methods for the comparison of two plans are likely to be invented. However, this patent discloses the use of such methods as a step in proactive planning.

We claim:

1. A computer-implemented method for proactive planning comprising:
   1) employing a planning engine comprising processes for generating an executable plan for a known period of execution;
   2) inputting to the planning engine real time planning data, said planning data being derived by an automated process from real enterprise data;
   3) monitoring said input planning data;
   4) utilizing said input ping data selectively for determining if and/or when the executable plan is to be revised during said period of execution by said planning engine, such that depending upon a magnitude of change, as represented by said input planning data, to said executable plan, said planning engine is selectively employed; and
   5) allocating resources based on said determining.

2. A method according to claim 1, further comprising using information about changes in the input planning data for determining if the executable plan is to be revised during said period of execution.

3. A method according to claim 2, further comprising using information about changes in the input planning data for determining when a revised plan is to become executable.

4. A method according to claim 1, further comprising implementing a revised executable plan in response to any detected change in the input planning data.

5. A method according to claim 1, further comprising implementing a revised executable plan in response to "if . . . then" rules imposed on the input planning data.

6. A method according to claim 1, further comprising using the planning engine for generating the executable plan and controlled by a planning calendar.

7. A method according to claim 6, further comprising changing the planning calendar to accommodate at least one of scheduling a new planning event, changing the time of a planning event, and eliminating a previously scheduled planning event.

8. A method according to claim 1, wherein said monitoring and utilizing comprises monitoring and utilizing said input planning data in an operational planning mode for determining if the executable plan is to be revised immediately.

9. A method according to claim 1, wherein said monitoring and utilizing comprises monitoring and utilizing said input planning data in a strategic planning mode for determining an optimal time to revise the executable plan.

10. A method according to claim 1, comprising implementing the method in a computer.

11. A computerized proactive planning system comprising:
   1) a planning engine for analyzing planning information and generating an executable plan upon the significance of a planning event, said planning information being derived by an automated process from real enterprise data;
   2) a data base connected to the planning engine comprising planning information for input to the planning engine; and
   3) a proactive planning driver connected to the data base comprising:
      (i) means for detecting changes in the data base planning information;
      (ii) means using said detected changes in the data base, for determining a time when a planning event should occur; and
      (iii) means for communicating the timing of said planning event to the planning engine,
      wherein depending upon said changes in the data base planing information, said determining means selectively determines if and/or when the executable plan is to be revised during a period of execution by said planning engine, such that depending upon a magnitude of said changes, as represented by said planning information, to said executable plan, said planning engine is selectively employed.

12. A proactive planning system according to claim 11, wherein said proactive planning driver further comprises a planning engine for generating a candidate plan and a plan comparer.

13. A computer-implemented method for using a proactive planning system, which method comprises:
1) providing a proactive planning system, the system including:
   (i) a planning engine for analyzing planning information and generating an executable plan upon the signification of a planning event, said planning data being derived by an automated process from real enterprise data;
   (ii) at least one data base connected to the planning engine, the each said at least one data base comprising planning information for input to the planning engine;
   (iii) a proactive planning driver connected to the each at least one data base comprising:
      (1) means for detecting changes in the each at least one data base planning information;
      (2) means, using said detected changes in the each at least one data base, for determining a time when a planning event should occur; and
      (3) means for communicating the timing of said planning event to the planning engine; and
(2) monitoring information input to the planning system;
(3) using information input to the planning system selectively for determining if and/or when the executable plan is to be revised, such that depending upon a magnitude of said changes, as represented by said planning information, to said executable plan, said planning engine is selectively employed; and
4) allocating resources based on said determining.

14. A method according to claim 13, further comprising displaying, conditioned upon determining that the executable plan is to be revised, an output of the planning engine to an operator.

15. A method according to claim 13, further comprising transmitting, conditioned upon determining that the executable plan is to be revised, an output of the planning engine to an execution system.

16. A method according to claim 13, further comprising:
   3) analyzing each of one or more changes to the databases;
   4) determining an interval of time in a planning horizon that is affected by the change in data;
   5) subtracting the time required to execute the planning event from this interval of time to compute a date d; and
   6) scheduling a new planning event to take place at date d.

17. A method according to claim 13, further comprising:
   3) inputting to the planning engine from the each said at least one data base planning information comprising changed data;
   4) running the planning engine for generating a new plan;
   5) comparing the new plan to the executable plan for determining an interval in a planning horizon at which the new plan and the executable plan diverge;
   6) subtracting the time required to execute the planning process from this interval of time for computing a date d; and
   7) scheduling a new planning event to take place at date d.

18. A method according to claim 7, wherein the planning event comprises a shipment of a product.

* * * * *

UNITED STATES PATENT AND TRADEMARK OFFICE
CERTIFICATE OF CORRECTION

| | |
|---|---|
| PATENT NO. | : 6,032,121 |
| APPLICATION NO. | : 08/856854 |
| DATED | : February 29, 2000 |
| INVENTOR(S) | : Brenda Lynn Dietrich et al. |

It is certified that error appears in the above-identified patent and that said Letters Patent is hereby corrected as shown below:

In Column 12, line 2 claim 1, please delete "ping" to "planning". It should read:
4) utilizing said input planning data selectively for determining if and/or when the executable plan is to be revised during said period of execution by said planning engine, such that depending upon a magnitude of change, as represented by said input planning data, to said executable plan, said planning engine is selectively employed; and Signed and Sealed this Eighth Day of April, 2008

JON W. DUDAS
*Director of the United States Patent and Trademark Office*